Patented July 29, 1952

2,605,248

UNITED STATES PATENT OFFICE 2,605,248

HEAT-CURABLE MIXTURES OF BUTADIENE-ACRYLONITRILE COPOLYMERS AND PHENOL-ALDEHYDE RESINS AND METHOD OF MAKING

Charles F. Fisk, Clifton, N. J., assignor to United States Rubber Company, New York, N. Y., a corporation of New Jersey No Drawing. Application July 7, 1950, Serial No. 172,629

12 Claims. (Cl. 260—43)

This invention relates to an improvement in compositions of matter comprising heat-curable and heat-cured mutually compatible mixtures of phenol-aldehyde resins and butadiene-acrylonitrile elastomers. More particularly the invention relates to a new technique discovered by me whereby the rate of hardening or curing of such mixtures is greatly accelerated and a cured product having greatly improved modulus and resistance to creep at elevated temperatures is obtained.

Much research work has been done in recent years on thermoset products based upon mutually compatible mixtures of butadiene-acrylonitrile rubbery copolymers and soluble, fusible phenol-aldehyde resins. It has been customary to add hexamethylenetetramine during the formulation of such mixtures to provide a source of formaldehyde for effecting thermosetting of the phenolic resin upon heat curing the mixture.

The present invention is based upon my discovery that by incorporating a minor proportion of boric acid or an alkali metal or ammonium salt of a boric or a polyboric acid in such mixtures before curing, the rate of cure is considerably accelerated and the cured product manifests a considerably improved modulus and resistance to creep at elevated temperatures, e. g., at 100° C. to 150° C.

In practicing my invention I generally employ a phenol-aldehyde resin which is soluble, fusible and capable of cross-linking with formaldehyde, or a material supplying formaldehyde, such as paraformaldehyde or hexamethylenetetramine, under the conditions of curing. The phenolic resin is almost invariably of the type known in the art as a novolak, prepared by the condensation of phenol and formaldehyde in the presence of an acid catalyst, the ratio of phenol to formaldehyde being such that the resin is fusible and soluble in polar solvents. The resin may be a straight phenol-aldehyde resin or it may be modified with any suitable modifying agent according to known practice.

Thus, the resin can be based upon common trifunctional phenols, e. g., ordinary phenol. The trifunctional phenols are those which are free from substitution in the three positions ortho and para to the phenolic hydroxyl group. The resin can be modified by employing such a trifunctional phenol in conjunction with another phenol which may be trifunctional, difunctional or monofunctional. For example, I can use a resin based upon ordinary phenol but modified or co-condensed with a lesser proportion of any of the following phenols, which may be either pure or mixed: the cresols, the xylenols, the trimethylphenols, monochlorophenols, dichlorophenols, diamylphenols, diisopropylphenols, p-tertiary-butylphenol, p-phenylphenol, resorcinol, and hydroquinone. I especially prefer to employ a resin based upon ordinary phenol and the phenol which is obtained from cashew nut shell oil by heating whereby it is converted to the long-chain unsaturated phenol m-(7-tetradecenyl) phenol commonly known as cardanol. When a mixture of ordinary phenol and cardanol is reacted with formaldehyde in a manner well known to the art, there is produced a soluble, fusible, cashew nut shell oil-modified resin which, upon being heated with a minor proportion of hexamethylenetetramine, is converted to the insoluble, infusible state. The amount of the cashew nut shell oil phenol employed for modifying the resin preferably ranges from 3 to 12 mol percent based on the two phenols.

Cashew nut shell oil-modified phenol-aldehyde resins which are extremely satisfactory for use in the present invention are available commercially. An example of such a resin is that known in the trade as Durez No. 12686. Another example is Durez 12687, which is a mixture of 92–94 parts of Durez 12686 and 6–8 parts of hexamethylenetetramine. Such resins are typically made by heating the phenols and the aldehyde, typically formaldehyde, in the presence of an acidic catalyst, e. g., sulfuric or hydrochloric acid, to an oil-soluble stage. During the final stage of the resin-forming reaction, the resin is advanced to the desired state at which it is still reactive with hexamethylenetetramine to the insoluble, infusible condition, and volatile materials are removed therefrom, these objectives being accomplished by passing superheated steam through the charge until the residual mixture has reached a suitable elevated temperature, e. g., 150° C. to 225° C.

The elastomer employed in the practice of my invention is a butadiene-acrylonitrile rubbery copolymer of known type having a combined acrylonitrile content ranging between 10 and 55 mol-percent. Examples are the commercially available materials known as Perbunan 18, Perbunan 26, Perbunan 35, Hycar OR–15 and Hycar OR–25. The rubbery copolymer used should be mutually compatible with the phenolic resin.

The resin should be soluble in the rubbery copolymer at least to the extent of 10% and preferably at least to the extent of 50%, on the weight of the copolymer. One skilled in the art can readily determine whether a given resin and a given rubbery copolymer have the necessary degree of mutual solubility. The mutual solubility can be readily judged by observing the transparency of the mixture before curing.

The relative proportions of the phenolic resin and the rubbery copolymer can vary from 20 to 70% by weight of the resin and correspondingly from 80 to 30% by weight of the rubbery copolymer, these proportions being based upon the sum of the resin and the rubbery copolymer. Preferably, proportions ranging from 40 to 60% of the resin and from 60 to 40% of the rubbery copolymer are used.

The mixture of resin and rubber should contain a suitable proportion of a hardening agent for the resin. Hexamethylenetetramine is by far the preferred material for this purpose since it is capable of giving off formaldehyde under the conditions of curing whereby the resin is advanced to the insoluble, infusible condition. I can also use formaldehyde, or any of the polymeric formaldehydes such as paraformaldehyde, in conjunction with ammonia or an ammonium salt such as ammonium carbonate as the hardening agent, since such procedures will lead to the formation of hexamethylenetetramine in situ and therefore in effect amount to the addition of hexamethylenetetramine.

The mutual compatibility, or the solubility of the resin and the elastomer in one another, should be such that after the curing with the hexamethylenetetramine is completed, the condensed cross-linked resin still resmains dissolved in the rubber. Again this can be judged by the transparency of the cured mixture. Thus the cured product can be visualized as a normally cross-linked phenolic resin which however is swollen by a high-molecular-weight, non-volatile solvent and plasticizer, namely, the rubber.

In accordance with the present invention, there is incorporated with the mixture, before curing, a compound selected from the group consisting of boric acid and the alkali metal and ammonium salts of boric acids. As used in this specification and in the claims, the expression "salts of boric acid" denotes the salts of boric acid proper, i. e., orthoboric acid, $H_3BO_3$, as well as the salts of the related or derivative boric acids, namely metaboric acid, $HBO_2$, and polyboric acids such at tetraboric acid, $H_2B_4O_7$. Thus I can use ammonium borate, which usually is assigned the formula $NH_4HB_4O_7$, and which is commonly made by bringing together ammonia in the form of ammonium hydroxide and boric acid. In the practice of the present invention ammonium borates analyzing from 6 to 13% of ammonia are generally used. Examples of alkali metal salts of boric acids which can be used in my invention are sodium metaborate ($Na_2B_2O_4$) and sodium tetraborate ($Na_2B_4O_7$). The corresponding potassium salts can be used although they are more expensive. As previously indicated, instead of using the salts, I can use boric acid itself.

The amount of the boric acid or alkali metal or ammonium salt of a boric acid used in the practice of my invention may vary widely but will seldom be outside of the limits of from 0.5 to 10% by weight based on the sum of the phenolic resin and the butadiene-acrylonitrile rubbery copolymer. Generally the proportion used will not exceed 5% of the weight of resin and rubber.

After the mixture of the resin, rubber, hardening agent, filler if desired, and boric acid or salt thereof has been prepared, using any method of incorporation which will give a uniform homogenous mixture, this mixture is subjected to curing which is done in the conventional manner, namely by heating at an elevated temperature until the curing reaction is completed.

From the physico-chemical point of view, the best and most convenient way of measuring the state of cure or degree of polymerization or condensation is measuring the modulus at 100° C. or at some higher temperature. This is preferable to measuring the modulus at room temperature because after the cure has advanced to a certain point, further condensation does not greatly change the modulus at room temperature but does strongly increase the modulus at elevated temperatures. In general, a high modulus and low creep at elevated temperature are desirable as long as these are attained in a way which is consistent with meeting the other engineering requirements. The curing is generally done at a temperature of at least 300° F. The temperature can range upwardly from this value to a point at which thermal decomposition of the mixture or of some component thereof would take place to an objectionable extent.

The following data show how the advance in the cure of a typical mixture of phenolic resin and butadiene-acrylonitrile rubbery copolymer is reflected in an increase in modulus and a decrease in creep factor. Here the compound contains no accelerator other than hexamethylenetetramine, which, although it is often mis-named an accelerator, is not truly an accelerator. The zinc stearate is used merely as a mold release agent.

Formulation:
```
Hycar OR-15_____parts by weight__ 100
Durez 12687_____do____ 100
Diatomaceous earth_____do____ 100
Zinc stearate_____do____   2
Mold cure temperature_____°F___ 330
Mold cure pressure_____p. s. i__ 300
```

| Minutes Cure Time | Modulus, (p. s. i.)×10⁻³ | | | Creep Factor at— | | |
|---|---|---|---|---|---|---|
| | 25° C. | 100° C. | 150° C. | 25° C. | 100° C. | 150° C. |
| 0 | 10 | 0 | 0 | 3.00 | | |
| 1 | 78 | 1.5 | | 1.30 | 1.70 | |
| 2 | 95 | 2.7 | | 1.23 | 1.91 | |
| 5 | 119 | 11 | 2.8 | 1.17 | 1.78 | 1.85 |
| 10 | 122 | 16 | 4.7 | 1.15 | 1.70 | 1.82 |
| 30 | 140 | 23 | 9.6 | 1.15 | 1.56 | 1.75 |

The modulus is expressed to correspond to the usual engineering flexural modulus in lbs. per square inch. Actually, the modulus is tested in torsion using the apparatus, procedure, and calculation method described by Clash and Berg, Industrial and Engineering Chemistry 34, 1218 (1942).

When phenolic gum plastics are subjected to deformation they exhibit creep. For this reason, modulus is calculated based on the deformation ($D_{10}$) observed after the load has been applied for 10 seconds. To indicate the creep tendency a deformation ($D_{100}$) is also observed after the load has been applied for 100 seconds, and the dimensionless ratio $$\frac{D_{100}}{D_{10}}$$

is arbitrarily called the "creep factor."

In accordance with the present invention, the addition of 5 parts of ammonium borate greatly accelerates the rate of cure. In other words, the modulus of the cured product at 100° C. for a given time of cure is considerably higher when the ammonium borate is present. This is shown by Tables Ia and Ib which give the modulus of compounds cured for various lengths of time with and without 5 parts of ammonium borate.

The ammonium borate used in Tables Ia through VI analyzed 6.5% of ammonia but other borates of various ammonia contents would serve as well. In Table Ia the volume loading of three different fillers is kept constant while the Hycar/Durez weight ratio is kept fixed at 1:1. In Table Ib the ratio of Hycar to Durez is varied, while the volume loading of one filler (Dicalite) is kept constant.

It will be seen from Tables Ia and Ib that for a given time of cure the modulus at 100° C. is approximately doubled by the presence of the borate. This effect is obtained whether the filler be wood flour, carbon black, clay or diatomaceous earth, and whether the resin-to-rubber ratio is 67/100, 100/100, or 150/100.

Table II gives some of the physical properties measured on the compounds of Table I.

TABLE II

*Physical properties obtained with and without borate present*

| Mixture in Table I | Amm. Borate | Cure at 330° F. | Shore D | 25° C. Modulus (p.s.i.)×10⁻³ | 100° C. Modulus | 100° C. Creep Factor | 25° C. Impact Strength ft. lbs./inch notch | Shear Strength p.s.i. |
|---|---|---|---|---|---|---|---|---|
| A | Yes | 5' | 69 | 141 | 32 | 1.51 | 1.3 | 4,150 |
|   | No  | 5' | 68 | 115 | 15 | 1.76 | 1.7 | 3,650 |
|   | No  | 30'| 71 | 125 | 25 | 1.50 | 1.9 | 4,150 |
| B | Yes | 5' | 72 | 104 | 26 | 1.47 | 1.5 | 4,650 |
|   | No  | 5' | 71 | 95  | 11 | 1.81 | 3.2 | 4,800 |
|   | No  | 30'| 71 | 102 | 20 | 1.50 | 2.6 | 5,500 |
| C | Yes | 5' | 71 | 161 | 36 | 1.49 | 1.5 | 4,650 |
|   | No  | 5' | 68 | 126 | 14 | 1.71 | 2.3 | 4,450 |
|   | No  | 30'| 73 | 161 | 26 | 1.54 | 2.4 | 5,200 |
| D | Yes | 5' | 58 | 56  | 12 | 1.50 | 3.1 | 2,950 |
|   | No  | 5' | 56 | 43  | 4  | 1.79 | 11.0| 4,100 |
|   | No  | 30'| 60 | 54  | 8  | 1.55 | 4.7 | 3,850 |
| E | Yes | 5' | 71 | 128 | 31 | 1.47 | 1.4 | 4,350 |
|   | No  | 5' | 69 | 119 | 11 | 1.78 | 1.4 | 4,450 |
|   | No  | 30'| 72 | 140 | 23 | 1.56 | 1.6 | 4,550 |
| F | Yes | 5' | 78 | 254 | 51 | 1.49 | 0.65| 6,000 |
|   | No  | 5' | 77 | 253 | 23 | 1.70 | 1.3 | 5,900 |
|   | No  | 30'| 81 | 258 | 48 | 1.56 | 0.95| 6,300 |

AMMONIUM BORATE AS A CURE ACCELERATOR AS SHOWN BY MODULUS AT 100° C.

TABLE Ia

Base formulation:
Hycar OR-15 _____ 100 grams
Zinc stearate _____ 2 grams
Durez 12687 _____ 100 grams
Filler _____ 20 ccs./100 g. rubber and resin
Ammonium borate _____ 0 or 5 grams as shown

| Mixture | A | | B | | C | |
|---|---|---|---|---|---|---|
|   | 50 Parts by Weight Wood Flour | | 72 Parts by Weight Carbon Black | | 104 Parts by Weight Suprex Clay | |
| Cure at 330° F. | With Borate | Without Borate | With Borate | Without Borate | With Borate | Without Borate |
| 5' | ¹32 | 15 | 26 | 11 | 36 | 14 |
| 10' | ¹34 | 18 | 31 | 14 | 45 | 20 |
| 30' | ¹39 | 25 | 34 | 20 | 51 | 26 |

¹ Figures show modulus at 100° C. in thousands of p.s.i. The higher the modulus the more complete is the degree of polymerization or cure.

TABLE Ib

Base formulation:
Hycar OR-15 _____ 100 grams
Zinc stearate _____ 2 grams
Durez 12687 _____ As shown
Diatomaceous earth (Dicalite) __ 78, 93 or 116 (20 ccs./100 g. rubber and resin)
Ammonium borate _____ 0 or 5 as shown

| Mixture | D | | E | | F | |
|---|---|---|---|---|---|---|
|   | 67 Parts Durez 12687—78 Parts Dicalite | | 100 Parts Durez 12687—93 Parts Dicalite | | 150 Parts Durez 12687—116 Parts Dicalite | |
| Cure at 330° F. | With Borate | Without Borate | With Borate | Without Borate | With Borate | Without Borate |
| 5' | 11.5 | 4 | 31 | 11 | 51 | 23 |
| 10' | 14.5 | 5 | 34 | 16 | 62 | 29 |
| 30' | 15 | 7.5 | 40 | 23 | 86 | 48 |

Table III shows the improvement in modulus and creep factor at 150° C. of some of the mixtures in Table I as a result of curing with ammonium borate.

TABLE III

*Ammonium borate as a cure accelerator as shown by modulus and creep factor at 150° C.*

| Mixture in Table I | Cure at 330° F. | Modulus at 150° C. | | Creep Factor at 150° C. | |
|---|---|---|---|---|---|
|   |   | With Borate | Without Borate | With Borate | Without Borate |
| A | 5'  | ¹16 | 2.5  | 1.75 | 1.73 |
|   | 10' | ¹25 | 4.1  | 1.65 | 1.72 |
|   | 30' | ¹29 | 14   | 1.46 | 1.56 |
| B | 5'  | ¹18 | 3.1  | 1.65 | 1.96 |
|   | 10' | ¹21 | 3.8  | 1.59 | 1.79 |
|   | 30' | ¹33 | 7.2  | 1.38 | 1.76 |
| C | 5'  | ¹19 | 2.7  | 1.80 | 1.74 |
|   | 10' | ¹26 | 4.3  | 1.61 | 1.76 |
|   | 30' | ¹40 | 8.3  | 1.47 | 1.69 |
| D | 5'  | ¹19 | 2.8  | 1.65 | 1.85 |
|   | 10' | ¹26 | 4.7  | 1.54 | 1.82 |
|   | 30' | ¹34 | 9.6  | 1.37 | 1.75 |

¹ Figures show modulus at 150° C. in thousands of p.s.i. The higher the modulus the more complete is the degree of polymerization or cure.

Table IV shows that the same results are obtained whether the commercial resin Durez 12686 or a laboratory phenolic resin is employed. In Examples G and H, reported in Table IV, the laboratory phenolic resin used was made as follows:

A mixture of 9.5 mols of ordinary phenol, 0.5 mol of cardanol sold as Cardanol 923 by the Irvington Varnish Company, 8.0 mols of formaldehyde (added gradually) and 0.12 mol of HCl in water was heated for three hours at 95° C., after which the water was removed by heating the mixture, under reduced pressure, to about 160° C. The resin obtained was soluble in alcohol, sintered at 82° C., and when mixed with 7% hexamethylenetetramine had a gel time of about 1 minute at 300° F.

TABLE IV

*Effect of ammonium borate*

COMPARISON OF A LABORATORY PHENOLIC WITH DUREZ 12686

| Mixture | G | H | I | J |
|---|---|---|---|---|
| Hycar OR-15 | 100 | 100 | 100 | 100 |
| Laboratory Phenolic Resin | 93 | 93 | | |
| Durez 12686 | | | 93 | 93 |
| Diatomaceous Earth | 93 | 93 | 93 | 93 |
| Zinc Stearate | 2 | 2 | 2 | 2 |
| Hexa | 7 | 7 | 7 | 7 |
| Ammonium Borate | | 5 | | 5 |

| | Cure Time at 330° F. | G | H | I | J |
|---|---|---|---|---|---|
| 100° C. Modulus (p. s. i.)×10⁻³ | 5' | 16 | 33 | 11 | 31 |
| | 10' | | | 16 | 34 |
| | 30' | 26 | 42 | 23 | 40 |
| 100° C. Creep Factor | 5' | 1.69 | 1.42 | 1.78 | 1.47 |
| | 10' | | | 1.70 | 1.43 |
| | 30' | 1.50 | 1.38 | 1.56 | 1.34 |
| 25° C. Modulus (p. s. i.)×10⁻³ | 5' | 121 | 117 | 119 | 128 |
| | 10' | | | 122 | 139 |
| | 30' | 139 | 138 | 140 | 137 |
| 25° C. Creep Factor | 5' | 1.20 | 1.15 | 1.17 | 1.15 |
| | 10' | | | 1.15 | 1.15 |
| | 30' | 1.18 | 1.16 | 1.16 | 1.13 |

Table V shows that the 100° C. modulus of a cured product containing ammonium borate as the accelerator is not affected by boiling in water. Cured samples with and without borate accelerator were boiled for two hours in water, which caused absorption of 1.5% of water. The samples were then dried and tested for modulus and creep factor at 100° C. The sample obtained from mixture A2 still showed approximately twice the modulus of the sample obtained from mixture A1. Under the conditions of the boiling water test there was accordingly no disintegration or weakening of the internal structure of the thermoset resin, whereas it is well known that a non-setting hydroxylic resin which has been borated, such as borated polyvinyl alcohol complex, is very readily hydrolyzed, with disintegration of the structure.

TABLE V

*Compounds cured with borate are not affected by hot water*

| Mixture | A1 | A2 |
|---|---|---|
| Hycar OR-15 | 100 | 100 |
| Durez 12687 | 100 | 100 |
| Wood Flour | 50 | 50 |
| Zinc Stearate | 2 | 2 |
| Ammonium Borate | | 5 |

| | Cure at 330° F. | X | Y | X | Y |
|---|---|---|---|---|---|
| 100° C. Modulus (p. s. i.) ×10⁻³ | 5' | 15 | 16 | 32 | 33 |
| | 10' | 18 | 19 | 34 | 34 |
| | 30' | 25 | 25 | 39 | 40 |
| 100° C.—Creep Factor | 5' | 1.76 | 1.57 | 1.51 | 1.43 |
| | 10' | 1.59 | 1.52 | 1.48 | 1.37 |
| | 30' | 1.50 | 1.42 | 1.42 | 1.35 |

Treatment:
X: Original sample
Y: Sample boiled 2 hours in water, then dried 2 days at 25° C.

Applicant conducted other experiments which showed that the addition of 5 parts of several other ammonium salts, namely, the carbonate, thiosulfate, and thiocyanate, had no effect whatever on the rate of cure of the mixtures with which the present invention is concerned.

Applicant next tried sodium tetraborate (i. e., borax, $Na_2B_4O_7.10H_2O$) and boric acid and found them to be accelerators of the cure. He also compared the results obtained by using 5 and 10 parts of ammonium borate. The results of these tests are given in Table VI.

TABLE VI

*Comparison of ammonium borate, sodium borate, and boric acid as cure accelerators*

| Mixture | K | L | M | N | O | P |
|---|---|---|---|---|---|---|
| Hycar OR-15 | 100 | 100 | 100 | 100 | 100 | 100 |
| Durez 12687 | 100 | 100 | 100 | 100 | 100 | 100 |
| Diatomaceous Earth | 93 | 93 | 93 | 93 | 93 | 93 |
| Zinc Stearate | 2 | 2 | 2 | 2 | 2 | 2 |
| Ammonium Borate | | 5 | 10 | | | |
| Sodium Borate (borax) | | | | 7 | | |
| Boric Acid | | | | | 1.2 | 5 |

| | Cure Time at 330° F. | K | L | M | N | O | P |
|---|---|---|---|---|---|---|---|
| 100° C. Modulus (p.s.i.)×10⁻³ | 5' | 8 | 31 | 34 | 19 | 15 | 27 |
| | 10' | 13 | 34 | 35 | 25 | 20 | 26 |
| 100° C. Creep Factor | 5' | 1.86 | 1.47 | 1.47 | 1.58 | 1.70 | 1.51 |
| | 10' | 1.64 | 1.43 | 1.46 | 1.49 | 1.70 | 1.52 |

From Table VI it will be seen that ammonium borate, borax, and boric acid behave in a similar manner in accelerating the cure of the mixtures with which the present invention is concerned. It will also be seen that the use of 10 parts of ammonium borate gives the same results as five parts thereof.

The present invention provides three important advantages over common practice. First, it permits cures to be completed or advanced to a given degree in a shorter time than usual. Secondly, it provides cured products having a modulus at 100° C. or over which is substantially higher than normal. Thirdly, it substantially reduces the rate of creep under load at high temperatures. This improved resistance to heat softening is highly desirable in applications of thermoset phenolic resin-rubber products for high temperature service, such as gaskets, plating barrels, motor slot insulation, chemical pipe, oil-less bearings, filter plates, silent gears, etc.

A distinction must be made to show the advantages in resistance to heat-softening obtained by the present invention. It is apparent that if a high modulus at 100° C. is required, it can readily be obtained in an ordinary phenolic resin-rubber composition by using a high resin-to-rubber ratio, a high filler loading, or both. The drawback to these methods is that both of them increase the hardness and modulus at room temperature which, in most cases, is quite undesirable because brittleness, i. e., tendency to break upon impact, is greatly increased. However, by the use of boric acid or its salts in accordance with my invention, there is obtained a product which has superior high temperature modulus and creep resistance in combination with a given room temperature hardness and impact resistance which are established in advance by appropriate selection of resin content and filler loading.

Having thus described my invention, what I claim and desire to protect by Letters Patent is:

1. A composition of matter comprising a mixture of a soluble, fusible, phenol-aldehyde resin, hexamethylenetetramine as a hardening agent therefor, a butadiene-acrylonitrile rubbery copolymer, said resin and said rubbery copolymer being mutually compatible, and an accelerator composed of a compound selected from the group consisting of boric acid and the alkali metal and ammonium salts of boric acids.

2. A composition of matter comprising a mixture of a soluble, fusible, cashew nut shell oil-modified phenol-aldehyde resin, hexamethylenetetramine as a hardening agent for said resin, a butadiene-acrylonitrile rubber copolymer, said resin and said rubbery copolymer being mutually compatible, and an accelerator composed of a compound selected from the group consisting of boric acid and the alkali metal and ammonium salts of boric acids.

3. A composition of matter comprising a mixture of a soluble, fusible, phenol-aldehyde resin, hexamethylenetetramine as a hardening agent for said resin, a butadiene-acrylonitrile rubbery copolymer, said resin and said rubbery copolymer being mutually compatible and being present in relative proportions ranging from 20 to 70% by weight of said resin and correspondingly from 80 to 30% by weight of said rubbery copolymer based on the sum of said resin and said rubbery copolymer, and from 0.5 to 10% by weight based on the sum of said resin and said rubbery copolymer of an accelerator composed of a compound selected from the group consisting of boric acid and the alkali metal and ammonium salts of boric acids.

4. A composition of matter comprising a mixture of a soluble, fusible, phenol-aldehyde resin, hexamethylenetetramine as a hardening agent for said resin, a butadiene-acrylonitrile rubbery copolymer, said resin and said rubbery copolymer being mutually compatible and being present in relative proportions ranging from 40 to 60% by weight of said resin and correspondingly from 60 to 40% by weight of said rubbery copolymer based on the sum of said resin and said rubbery copolymer, and from 0.5 to 10% by weight based on the sum of said resin and said rubbery copolymer of an accelerator composed of a compound selected from the group consisting of boric acid and the alkali metal and ammonium salts of boric acids.

5. A composition of matter comprising a mixture of a soluble, fusible, cashew nut shell oil-modified phenol-aldehyde resin, hexamethylenetetramine as a hardening agent for said resin, a butadiene-acrylonitrile rubbery copolymer, said resin and said rubbery copolymer being mutually compatible and being present in relative proportions ranging from 40 to 60% by weight of said resin and correspondingly from 60 to 40% by weight of said rubbery copolymer based on the sum of said resin and said rubbery copolymer, and from 0.5 to 10% by weight based on the sum of said resin and said rubbery copolymer of an accelerator composed of a compound selected from the group consisting of boric acid, and the alkali metal and ammonium salts of boric acids.

6. A composition as set forth in claim 5 wherein said compound is ammonium borate.

7. A composition as set forth in claim 5 wherein said compound is sodium tetraborate.

8. A composition as set forth in claim 5 wherein said compound is boric acid.

9. A heat-cured composition of matter comprising a mixture of a soluble, fusible, phenol-aldehyde resin, hexamethylenetetramine as a hardening agent therefor, a butadiene-acrylonitrile rubbery copolymer, said resin and said rubbery copolymer being mutually compatible, and an accelerator composed of a compound selected from the group consisting of boric acid and the alkali metal and ammonium salts of boric acids.

10. A heat-cured composition of matter comprising a mixture of a soluble, fusible, cashew nut shell oil-modified phenol-aldehyde resin, hexamethylenetetramine as a hardening agent for said resin, a butadiene-acrylonitrile rubbery copolymer, said resin and said rubbery copolymer being mutually compatible and being present in relative proportions ranging from 40 to 60% by weight of said resin and correspondingly from 60 to 40% by weight of said rubbery copolymer based on the sum of said resin and said rubbery copolymer, and from 0.5 to 10% by weight based on the sum of said resin and said rubbery copolymer of an accelerator composed of a compound selected from the group consisting of boric acid, and the alkali metal and ammonium salts of boric acids.

11. The method which comprises heating at a curing temperature of at least 300° F. a mixture of a soluble, fusible, phenol-aldehyde resin, hexamethylenetetramine as a hardening agent therefor, a butadiene-acrylonitrile rubbery copolymer, and an accelerator composed of a compound selected from the group consisting of boric acid and the alkali metal and ammonium salts of boric acids, until said mixture is cured and said resin is converted to the insoluble, infusible state, the presence of said compound considerably accelerating the rate of curing and giving a cured product having considerably improved modulus and resistance to creep at elevated temperature as compared to a similar mixture without said compound.

12. The method which comprises heating at a curing temperature of at least 300° F. a mixture of a soluble, fusible, cashew nut shell oil-modified phenol-aldehyde resin, hexamethylenetetramine as a hardening agent for said resin, a butadiene-acrylonitrile rubbery copolymer, and an accelerator composed of a compound selected from the group consisting of boric acid and the alkali metal and ammonium salts of boric acids, until said mixture is cured and said resin is converted to the insoluble, infusible state, the presence of said compound considerably accelerating the rate of curing and giving a cured product having considerably improved modulus and resistance to creep at elevated temperatures as compared to a similar mixture without said compound.

CHARLES F. FISK.

REFERENCES CITED

The following references are of record in the file of this patent:

UNITED STATES PATENTS

| Number | Name | Date |
|---|---|---|
| 2,156,124 | Novotny | Apr. 25, 1939 |
| 2,459,739 | Groten et al. | Jan. 18, 1949 |
| 2,532,374 | Shepard et al. | Dec. 5, 1950 |

OTHER REFERENCES

Shepard et al., Modern Plastic, Oct. 1946, pp. 154–156, 210 and 212.